United States Patent
Lee et al.

(10) Patent No.: US 8,369,895 B2
(45) Date of Patent: Feb. 5, 2013

(54) METHODS FOR ALIGNING POLLING TIMERS BY MOBILE STATION WITH SUBSCRIBER IDENTITY CARDS AND SYSTEMS UTILIZING THE SAME

(75) Inventors: Yu-Ju Lee, Taipei (TW); Pang-Hsin Shih, Taipei (TW); YiYo Lin, Taipei (TW); Chien-Yu Lan, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 1057 days.

(21) Appl. No.: 12/354,901

(22) Filed: Jan. 16, 2009

(65) Prior Publication Data
US 2009/0270130 A1  Oct. 29, 2009

Related U.S. Application Data

(60) Provisional application No. 61/047,143, filed on Apr. 23, 2008.

(51) Int. Cl.
*H04B 1/38* (2006.01)
(52) U.S. Cl. ......... 455/558; 455/458; 455/417; 455/515
(58) Field of Classification Search .......... 455/458, 455/558, 417, 515
See application file for complete search history.

(56) References Cited

U.S. PATENT DOCUMENTS

| | | | |
|---|---|---|---|
| 2001/0034247 A1* | 10/2001 | Namiki | 455/558 |
| 2002/0103009 A1* | 8/2002 | Sato | 455/558 |
| 2003/0125073 A1* | 7/2003 | Tsai et al. | 455/552 |
| 2007/0207798 A1* | 9/2007 | Talozi et al. | 455/423 |
| 2008/0020765 A1* | 1/2008 | Black et al. | 455/435.2 |
| 2008/0051143 A1* | 2/2008 | Chen et al. | 455/558 |
| 2009/0088211 A1* | 4/2009 | Kim | 455/558 |
| 2009/0093269 A1* | 4/2009 | Lee | 455/552.1 |
| 2010/0279698 A1* | 11/2010 | Wong | 455/450 |

\* cited by examiner

*Primary Examiner* — Rafael Pérez-Gutiérrez
*Assistant Examiner* — Lameka J. Kirk
(74) *Attorney, Agent, or Firm* — McClure, Qualey & Rodack, LLP (57) ABSTRACT

A method for aligning polling timer by a mobile station with a first subscriber identity card and a second subscriber identity card, executed by a processor of the mobile station, is provided. First, it is determined whether the second subscriber identity card is operated in an IDLE state when a first timer corresponding to the first subscriber identity card counts to a specific time period. Forthcoming periodic timings are adjusted for polling the first and second subscriber identity cards to be substantially consistent when the second subscriber identity card is operated in an IDLE state.

19 Claims, 8 Drawing Sheets

METHODS FOR ALIGNING POLLING TIMERS BY MOBILE STATION WITH SUBSCRIBER IDENTITY CARDS AND SYSTEMS UTILIZING THE SAME

CROSS REFERENCE TO RELATED APPLICATIONS

This application claims the benefit of U.S. Provisional Application No. 61/047,143, filed on Apr. 23, 2008, the entirety of which is incorporated by reference herein.

BACKGROUND OF THE INVENTION

1. Field of the Invention

The invention relates to a method for aligning polling timers, and more particularly to a method for aligning polling timers by a mobile station with multiple subscriber identity cards.

2. Description of the Related Art

Currently, the Global System for Mobile communication (GSM) standard is the popular standard for mobile phones in the world. The GSM standard, standardized by the European Telecommunication Standards Institute (ETSI) is a cellular network structure and a Time Division Multiple Access (TDMA) system. For a carrier frequency, the TDMA system will divide a frame into eight time slots, wherein each time slot is used to transmit a channel data for a subscriber. In addition, the General Packet Radio Service (GPRS) technology is one of the available technologies of a GSM system. The GPRS technology utilizes the unused channels in the GSM system to provide moderate speed data transmission. The Wideband Code Division Multiple Access (W-CDMA) is a wideband spread-spectrum mobile air interface that utilizes the direct-sequence spread spectrum method of asynchronous code division multiple access to achieve higher speeds and support more users compared to the implementation of time division multiplexing (TDMA) used by GSM systems. Time Division-Synchronous Code Division Multiple Access (TD-SCDMA) is another type of 3G mobile telecommunications standard.

A dual SIM mobile phone is a phone with two Subscriber Identity Modules (SIMs), which correspond to different telephone numbers. The dual SIM mobile phone allows a user to use two communication services without carrying two phones at the same time. For example, the same mobile phone may be used for business and private use with separate numbers and bills, thus providing convenience to mobile phone users.

BRIEF SUMMARY OF THE INVENTION

Methods for aligning polling timers by a mobile station with a first subscriber identity card and a second subscriber identity card and the systems utilizing the same are provided. An exemplary embodiment of a method for aligning polling timers by a mobile station with a first subscriber identity card and a second subscriber identity card, executed by a processor of the mobile station, is provided. It is determined whether the second subscriber identity card is operated in an IDLE state when a first timer corresponding to the first subscriber identity card counts to a specific time period. Forthcoming periodic timings are adjusted for polling the first and second subscriber identity cards to be substantially consistent when the second subscriber identity card is operated in an IDLE state.

Furthermore, another exemplary embodiment of a method for aligning polling timers t by a mobile station with a Baseband chip, a first subscriber identity card and a second subscriber identity card, executed by a processor of the mobile station, is provided. Two tasks, one for polling the first subscriber identity card and the other for polling the second subscriber identity card, are integrated into an integrated task for adjacently polling both the first and second identity cards when detecting a job queue comprising these two tasks. The integrated task is then executed.

Moreover, an exemplary embodiment of a system for aligning polling timers is provided. The system comprises a first subscriber identity card, a second subscriber identity card and a processor. The processor adjusts forthcoming periodic timings for polling the first and second subscriber identity cards to be substantially consistent. The processor enables two tasks one for polling the first subscriber identity card and the other for polling the second subscriber identity card are to be generated and put in a job queue one after another. The processor adjacently polls the first and second identity cards when detecting that the job queue comprising the tasks.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A subscriber identity module (SIM) card typically contains user account information, an international mobile subscriber identity (IMSI) and a set of SIM application toolkit (SAT) commands and provides storage space for phone book contacts. A micro-processing unit (MCU) of the Baseband chip (simply referred to as a Baseband MCU hereinafter) may interact with MCUs of the SIM cards (each simply referred to as a SIM MCU hereinafter) to fetch data or SAT commands from the plugged in SIM cards. A mobile station (MS) is immediately programmed after plugging in the SIM card. SIM cards may also be programmed to display custom menus for personalized services.

A universal SIM (USIM) card is inserted into a mobile station for universal mobile telecommunications system (UMTS) or Time Division-Synchronous Code Division Multiple Access (TD-SCDMA) system (also called 3G) telephony communication. The USIM card stores user account information, an IMSI, authentication information and a set of USIM Application Toolkit (USAT) commands and provides storage space for text messages and phone book contacts. A Baseband MCU may interact with an MCU of the USIM card (each simply referred to as a USIM MCU hereinafter) to fetch data or SAT commands from the plugged in USIM cards. The phone book on the USIM card is greatly enhanced when compared to the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in the UMTS. A mobile station is immediately programmed after plugging in the USIM card.

A removable User Identity Module (R-UIM) or a Code Division Multiple Access (CDMA) Subscriber Identity Module (CSIM) card has already been developed for a CDMA mobile station and is equivalent to the GSM SIM and 3G USIM except that it is capable of working in CDMA networks. The R-UIM or the CSIM card is physically compatible with the GSM SIM card, and provides similar security mechanisms for the CDMA system.

The International Mobile Subscriber Identity (IMSI) is a unique number associated with a global system for mobile communication (GSM) or a universal mobile telecommunications system (UMTS) network user. The IMSI may be sent by a mobile station to a GSM or UMTS network to acquire other details of the mobile user in the Home Location Register (HLR) or as locally copied in the Visitor Location Register (VLR). An IMSI is typically 15 digits long, but may be shorter (for example MTN South Africa's IMSIs are 14 digits). The first 3 digits are the Mobile Country Code (MCC), and they are followed by the Mobile Network Code (MNC), which is either 2 digits (European standard) or 3 digits (North American standard). The remaining digits are the mobile subscriber identification number (MSIN) for a GSM or UMTS network user.

Figure 1:
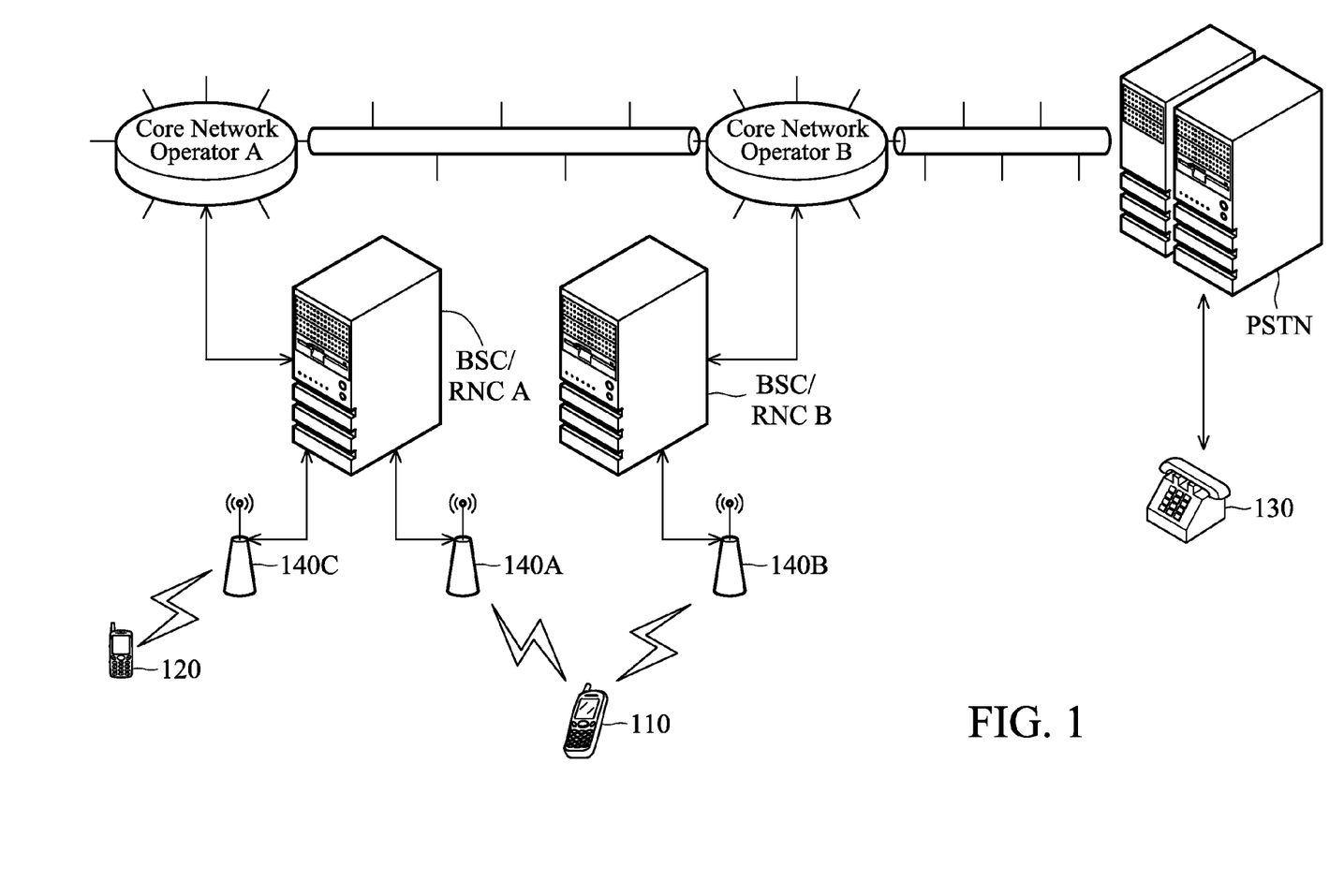
FIG. 1 shows a schematic diagram of a mobile communication network system.

FIG. 1 shows a schematic diagram of a mobile communication network system. In FIG. 1, a mobile station (may be called user equipment interchangeably) 110 with dual subscriber identity cards A and B may simultaneously access two core networks such as a Global System for Mobile Communications (GSM), Wideband Code Division Multiple Access (WCDMA), CDMA 2000 and Time Division-Synchronous Code Division Multiple Access (TD-SCDMA) network and the like after camping on two cells 140A and 140B (i.e. each may be a base station, a node-B or others). The subscriber identity card A or B may be a SIM, USIM, R-UIM or CSIM card. The mobile station 110 may make a voice or data call to a called party 120 or 130 through the GSM system with the Base Station Controller (BSC), WCDMA/CDMA2000/TD-SCDMA network with Radio Network Controller (RNC), Public Switched Telephone Network (PSTN) or any combinations thereof using either of the subscriber identity cards A or B. For example, the mobile station 110 may make a voice call with the subscriber identity card A to the called party 120 through the cell 140A, an BSC/RNC A and a cell 140C in sequence, or make a voice call with the subscriber identity card B to the called party 120 through the cell 140B, an BSC/RNC B, a core network operator B, a core network operator A, the BSC/RNC A and the cell 140C in sequence. Moreover, the mobile station 110 may receive a phone call request with either of the subscriber identity cards A or B from the calling party 120 or 130. For example, the mobile station 110 may receive a phone call request to the subscriber identity card B from the calling party 130 via a Public Switched Telephone Network (PSTN), the core network operator B, the BSC/RNC B and the cell 140B.

Figure 2:
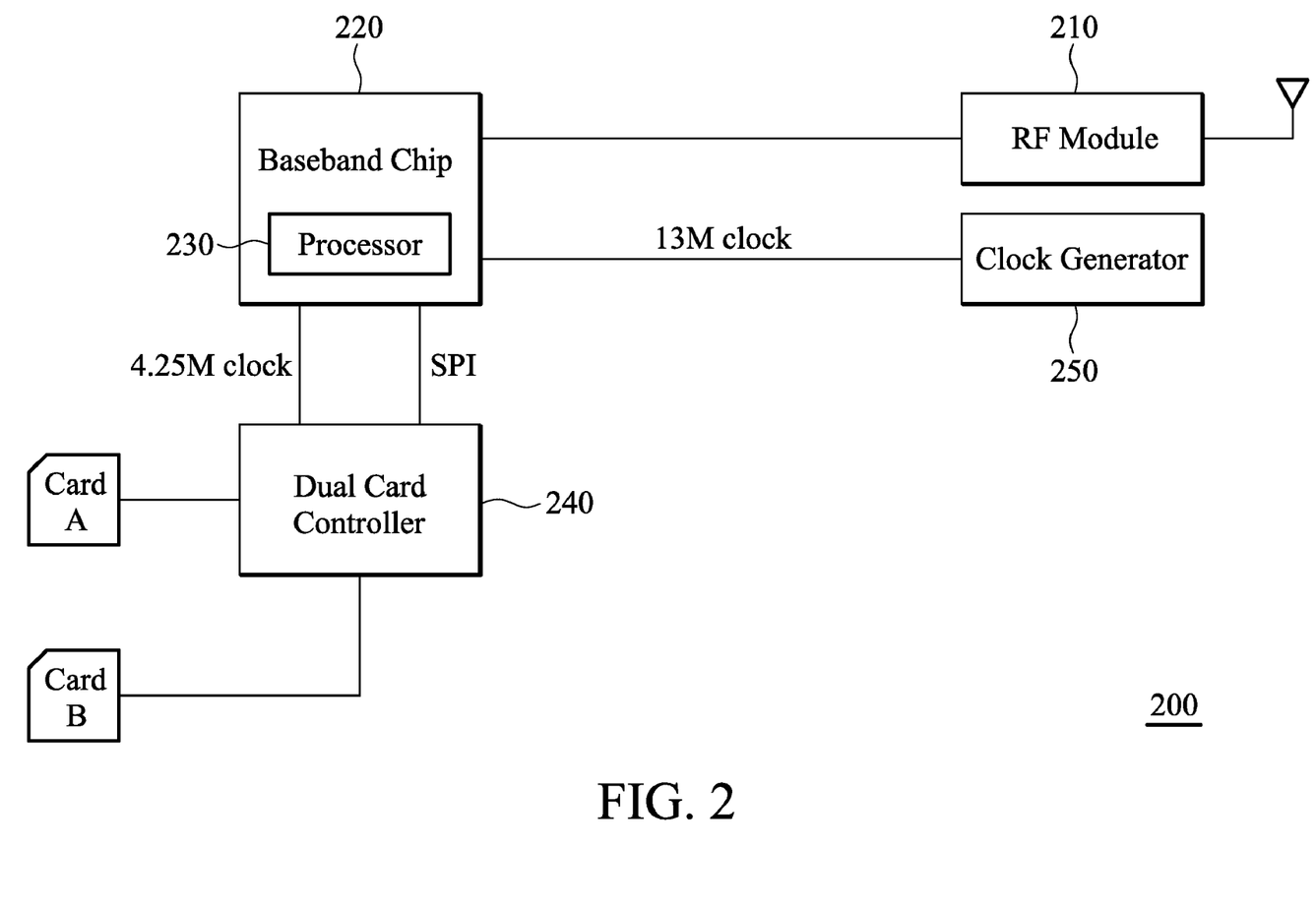
FIG. 2 shows a mobile station according to an embodiment of the invention.

FIG. 2 shows the hardware architecture of a mobile station 200 according to an embodiment of the invention. The mobile station 200 comprises an RF module 210, a Baseband chip 220, a dual card controller 240 and a clock generator 250, wherein the two subscriber identity cards A and B may be plugged into two sockets of the mobile station 200 connecting to the dual card controller 240. Those skilled in the art may practice the dual card controller 240 in the Baseband chip 220. Each of the subscriber identity cards A and B may be a SIM, USIM, R-UIM or CSIM card, which is provided by a particular network operator. The mobile station 200 may therefore camp on two cells provided by either the same network operator or different network operators for the plugged in cards A and B and operate in stand-by/idle modes, or even dedicated modes, using the same RF module and Baseband chip. The dual card controller 240 is coupled/connected between the Baseband chip 220 and the subscriber identity cards A and B. Furthermore, the Baseband chip 220 comprises a processor 230 for controlling the communications between the subscriber identity cards A and B and the RF module 210. Moreover, the processor 230 of the Baseband chip 220 may read data from the subscriber identity card A or B via the dual card controller 240, and may also write data to the subscriber identity card A or B via the dual card controller 240. Furthermore, the processor 230 of the Baseband chip 220 may control the dual card controller 240 to couple/connect one of the subscriber identity cards A and B, so as to enable communications between the Baseband chip 220 and the selected subscriber identity card or make a voice or data call to a called party via a cell that the selected subscriber identity card camps on.

An RF module (e.g. 210 of FIG. 2) receives wireless radio frequency signals, converts the received signals to baseband signals to be processed by a corresponding Baseband chip (e.g. 220 of FIG. 2), or receives baseband signals from the Baseband chip and converts the received signals to wireless radio frequency signals to be transmitted to a peer device. The RF module may comprise a plurality of hardware devices to perform radio frequency conversion. For example, the RF module may comprise a mixer to multiply the baseband signals with a carrier oscillated in the radio frequency of the wireless communication system, wherein the radio frequency may be, for example, 900 MHz or 1800 MHz or 2100 MHz for a global system for mobile communication (GSM), or 1900 MHz or 2100 MHz for a Universal Mobile Telecommunications System (UMTS) or a Time Division-Synchronous Code Division Multiple Access (TD-SCDMA) system. The Baseband chip further converts the baseband signals to a plurality of digital signals, and processes the digital signals, and vice versa. The Baseband chip may also comprise a plurality of hardware devices to perform baseband signal processing. The baseband signal processing may comprise analog to digital conversion (ADC), digital to analog conversion (DAC), gain adjustments, modulation/demodulation, encoding/decoding, and so on.

As the mobile station equipped with two or more subscriber identity cards as shown in FIG. 2, the mobile station can be operated in an idle mode and dedicated mode for each inserted subscriber identity card. Referring to FIG. 1, in an idle mode, the mobile station 110 is either powered off, searches for or measures the Broadcast Control Channel (BCCH) with better signal quality from a base station (e.g. the cell 140A or 140B) provided by a specific network operator, or is synchronized to the BCCH of a specific base station to be ready to perform a random access procedure on the Random Access Channel (RACH) to request a dedicated channel. In a dedicated mode, the mobile station 110 occupies a physical channel and tries to synchronize therewith, and establishes logical channels and switches throughout them.

Specifically, for each inserted subscriber identity card in the idle mode, the mobile station 110 continuously listens to the BCCH from a base station and reads the BCCH information and conducts periodic measurements of the signaling strength of the BCCH carriers in order to select a suitable cell to be camped on. In the idle mode, no exchange of signaling messages is presented with the network. The data required for Radio Resource Management (RR) and other signaling procedures is collected and stored, such as the list of neighboring BCCH carriers, thresholds for RR algorithms, Common Control Channel (CCCH) configurations, information regarding the use of RACH and Paging channel (PCH), or others. Such kind of information (e.g. system information (SI)) is broadcasted by a base station system on the BCCH and provides information about the network configuration. Moreover, the SI is available for all mobile stations currently in the cell. The SI comprises a Public Land Mobile Network (PLMN) code uniquely owned by a network operator. The PLMN code comprising a Mobile Country Code (MCC) and a Mobile Network Code (MNC), indicating which network operator is providing the communication services. In addition, a cell identity (ID) indicating which cell is broadcasting the BCCH is also contained in the SI. Furthermore, the SI may comprise network identification, neighboring cells, channel availability and power control requirements etc. The PLMN code may be acquired and stored in a corresponding subscriber identity card of the electronic device upon receiving the SI from the BCCH. The Base Station System (BSS) further continuously sends out, on all PCHs of a cell valid Layer 3, messages (PAGING REQUEST) which the mobile station 110 can decode and recognize if its address (e.g. its IMSI of a specific SIM card) is paged. The mobile station 110 periodical monitors the PCHs to avoid loss of paging calls.

Each exchange of signaling messages with the network, e.g. BSS, Mobile Switching Center (MSC) and the similar, requires an Radio Resource Management (RR) connection and the establishment of an LAPDm connection between a mobile station and BSS. Setting up the RR connection can be initiated by the mobile station or network. In either situation, the mobile station sends a channel request (CHAN-QUEST) on the RACH in order to get a channel assigned on the Access Grant Channel (AGCH), also referred to as an immediate assignment procedure. The channel request may be rejected by an immediate assignment reject procedure. If the network does not immediately answer to the channel request, the request is repeated for a certain number of times. In the situation of a network-initiated connection, a procedure is preceded by a paging call (PAGING REQUEST) to be answered by the mobile station (PAGING RESPONSE). After an RR connection has been successfully completed, higher protocol layers, Connection Management (CM) and Mobility Management (MM) can receive and transmit signaling messages.

In contrast to the setup of connections, the release is typically initiated by the network (CHANNEL RELEASE). The release may occur when the signaling transaction ends, there are too many errors, or the channel is removed due to a higher priority call, e.g. an emergency call, or end of a call.

Once an RR connection has been set up, the mobile station has either a Stand-alone Dedicated Control Channel (SDCCH) or a Traffic Channel (TCH) with associated Slow/Fast Associated Control Channel (SACCH/FACCH) available for exclusive bidirectional use.

Setting up an MM connection from the mobile station presumes the existence of an RR connection, but a single RR connection can be used by multiple MM connections. If the MM connection can be established, the MS sends the message CM-SERVICE REQUEST to the network. The message CM-SERVICE REQUEST contains information regarding a mobile subscriber (IMSI or Temporary Mobile Subscriber Identity (TMSI)), where a TMSI has only local significance within a Location Area and must be used together with the Location Area Identity (LAI) for the unique identification of a subscriber, as well as information regarding the requested service (outgoing voice call, short message service SMS transfer, activation or registration of a supplementary service, or others). If the mobile station receives the message CM-SERVICE ACCEPT or local message from the RR sub-layer that enciphering has been activated, it is treated as an acceptance of the service request, and the requesting CM entity is informed about the successful setup of an MM connection. Otherwise, if the service request has been rejected by the network, the mobile station receives a message CM-SERVICE REJECT, and the MM connection cannot be established.

The mobile station equipped with two or more inserted subscriber identity card cards as shown in FIG. 2, can be operated in an idle mode and connected mode for each inserted subscriber identity card, wherein the inserted subscriber identity cards are USIM cards. Referring to FIG. 1, in an idle mode, the mobile station selects (either automatically or manually) a PLMN to contact. The MS continuously listens to the BCCH to acquire an SI comprising a PLMN code uniquely owned by a network operator. The PLMN code comprising an MCC and an MNC, indicates which network operator is providing communication services. In addition, an ID indicating which cell is broadcasting the BCCH is also contained in the SI. The PLMN code may be acquired and stored in a corresponding USIM card of the electronic device upon receiving the SI from the BCCH. The mobile station searches for a suitable cell of the chosen PLMN, chooses that cell to provide available services, and tunes to its control channel, also referred to as "camping on a cell". After camping on a cell in an idle mode, the MS can receive system information and cell broadcast messages from a node-B (e.g. the cell 140A or 140B). The mobile station stays in an idle mode until the node-B transmits a request to establish a Radio Resource Control (RRC) connection. In the idle mode, the mobile station is identified by non-access stratum identities such as IMSI, TMSI and Packet-TMSI (P-TMSI).

In the Cell_DCH state of a connected mode, a dedicated physical channel is allocated to the mobile station, and the mobile station is known by its serving radio network controller (RNC) on a cell or active set level. The mobile station performs measurements and sends measurement reports according to measurement control information received from RNC. The mobile station with certain capabilities monitors the Forward Access Channel (FACH) for system information messages. In the Cell_FACH state of a connected mode, no dedicated physical channel is allocated for the mobile station, but a Random Access Channel (RACH) and FACH are used instead, for transmitting both signaling messages and small amounts of user plane data. In this state, the mobile station also listens to the Broadcast Channel (BCH) to acquire system information. The mobile station performs cell reselections, and after a reselection the mobile station typically sends a Cell Update message to the RNC, so that the RNC knows the MS location on a cell level. In the Cell_PCH state of a connected mode, the mobile station is known on a cell level in a Serving Radio Network Controller (SRNC), but the mobile station can be reached only via the Paging Channel (PCH). The URA_PCH state of a connected mode is very similar to the Cell_PCH state, except that the mobile station does not execute Cell Update after each cell reselection procedure, but instead reads the UMTS Terrestrial Radio Access Network (UTRAN) Registration Area (URA) identities from the BCH, and only if the URA changes (after cell reselection) does the mobile station inform its location to the SRNC. The mobile station leaves the connected mode and returns to the idle mode when the RRC connection is released or following RRC connection failure.

The establishment of an RRC connection and Signaling Radio Bearers (SRB) between a mobile station and UTRAN (RNC) is initiated by a request from higher layers (non-access stratum) on the mobile station side. In a network-originated case, the establishment is preceded by an RRC Paging message. The UTRAN (RNC) may respond with an RRC Connection Set-up message including a dedicated physical channel assignment for the mobile station (move to the Cell-FACH state), or a command to instruct the mobile station to use common channels (move to the Cell_FACH state).

A SIM application toolkit (SAT) is a standard of the GSM which enables an SIM MCU to initiate actions which can be used for various value added services. The SAT consists of a set of commands programmed into an SIM card which define how the SIM MCU interacts directly with the outside world and initiates commands independently of the mobile station and the network. The SAT enables the SIM MCU to build up an interactive exchange between a network application and an end user and access or control access to the network. The SIM MCU also provides SAT commands to the Baseband MCU to display a menu, ask for user input, or the similar. A SAT has been deployed by many network operators for many applications, often where a menu-based approach is required, such as Mobile Banking and content browsing. Designed as a single application environment, SAT can be started at the initial power up of the SIM card and is especially suited to low level applications with simple user interfaces.

A USIM Application Toolkit (USAT) is the equivalent of an SAT for 3G networks. A USAT enables the USIM MCU to initiate actions which can be used for various value added services delivered over the mobile station. The USAT is employed in a multi-application environment of 3G devices and is not activated until a specific application has been selected, unlike SAT, which is activated at startup. Certain functions are card related rather than application related.

To ensure that any of the inserted subscriber identity cards has not been removed during a call session, a processor of a Baseband chip (e.g. 230 of FIG. 2) sends, at regular intervals, a STATUS command during each call. A STATUS command may be issued during all predetermined inactive time periods (e.g. 30 second periods) to the Baseband interface during a call. Inactivity may be defined as the period starting from the end of the last communication or the last issued STATUS command. If no response data is received following issuance of the STATUS command, then the call is terminated as soon as possible, within a predetermined time period (e.g. 5 seconds), after the STATUS command has been sent. If a dedicated file (DF) is received following issuance of the STATUS command, and the indicated DF is not the same as that which was indicated in a previous response, or accessed by a previous command, then the call is terminated as soon as possible, within a predetermined time period (e.g. 5 seconds), after the response data has been received. The mentioned polling procedure is used to detect the removal of a subscriber identity card.

Figure 3:
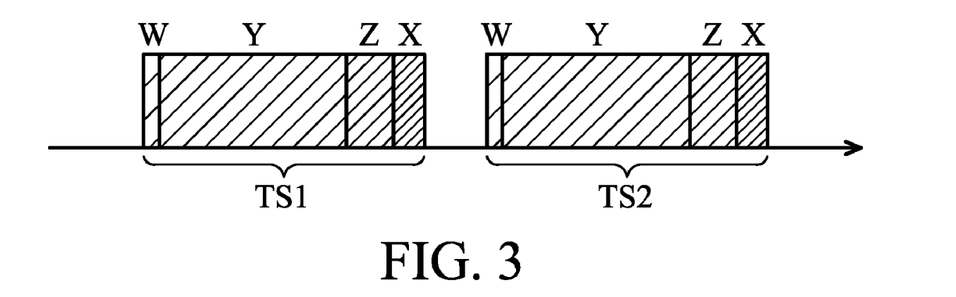
FIG. 3 shows a schematic diagram illustrating two sequences of time slots for issuing STATUS commands to the subscriber identity cards A and B.

FIG. 3 shows a schematic diagram illustrating two sequences of time slots for issuing STATUS commands to the subscriber identity cards A and B, where the commands are not aligned. A proactive polling procedure is performed by issuing a STATUS command to the subscriber identity card A during time period TS1 and issuing a STATUS command to the subscriber identity card B during time period TS2. Referring to FIG. 2, during each time interval W, the Baseband chip 220 directs the clock generator 250 to generate the clock signals with a frequency of a multiple of 13 MHz, and accordingly provides the clock signals of 4.25 MHz to the dual card controller 240. Furthermore, the Baseband chip 220 directs the dual card controller 240 to provide the clock signals of 4.25 MHz to the subscriber identity card A during the time interval W of the time period TS1, and directs the dual card controller 240 to provide the clock signals of 4.25 MHz to the subscriber identity card B during the time interval W of the time period TS2. The Baseband chip 220 issues a STATUS command to the subscriber identity card A through the dual card controller 240 during the time interval Y of the time period TS1, and issues a STATUS command to the subscriber identity card B through the dual card controller 240 during the time interval Y of the time period TS2. At the end of each time interval Y, a time interval Z is counted by a timer, which is configurable to a specific time between 10~20 ms. After receiving a signal indicating that the time interval Z has been reached (i.e. about the end of each time interval Z or the beginning of each time interval X), the Baseband chip 220 directs the dual card controller 240 to disable the clock signal provided to the subscriber identity card A or B. During each time interval X, the Baseband chip 220 may direct the dual card controller 240 to connect its SIM interface to another subscriber identity card via an SPI interface. For example, the Baseband chip 220 directs the dual card controller 240 to connect the SIM interface to the subscriber identity card B during the time interval X of the time period TS1, and directs the dual card controller 240 to connect the SIM interface to the subscriber identity card A during the time interval X of the time period TS2. Moreover, at the end of each time interval X, the Baseband chip 220 disables the clock signal provided to the dual card controller 240 and disables the clock generator 250. The time intervals W, Y, Z and X may require 1 ms, 8~25 ms, 10~20 ms and 1 ms, respectively. Note that the length of the time interval Z has to be set to guarantee that requisite operations for the subscriber identity card A or B can be successfully completed before the end of the time interval Z. It is to be understood that the Baseband chip 220 occupies most of its time issuing STATUS commands for the time interval Y and waits for completion of requisite operations for the time interval Z.

Two timers (may be implemented by hardware or software) are provided to activate proactive polling procedures for the subscriber identity cards A and B, respectively. Assuming that a timer A corresponding to the subscriber identity card A is a master timer while a timer B corresponding to the subscriber identity card B is a slave timer, when completing a communication process between the Baseband chip and the subscriber identity card A or an issuance process of a STATUS command issued to the subscriber identity card A, the timer A is reset and starts a re-count process. Similarly, the timer B is reset and starts to re-count when completing a communication process between the Baseband chip and the subscriber identity card B or an issuance process of a STATUS command to the subscriber identity card B. The processor of the Baseband chip receives a signal from the timer A or B when the timer A or B counts to a particular time period, such as about 30 seconds, from the moment of the last reset of the timer A or B.

Figure 4:
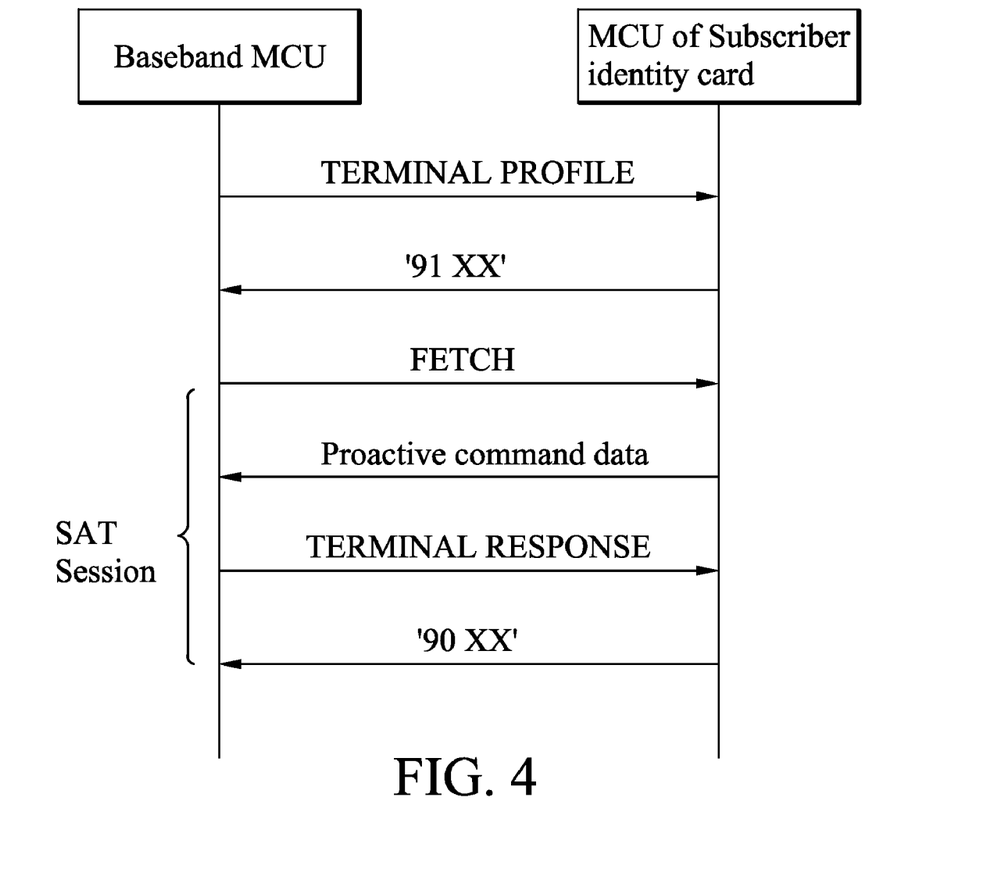
FIG. 4 shows a diagram illustrating an operation of a proactive command between the Baseband MCU and the subscriber identity card MCU.

FIG. 4 shows a diagram illustrating exemplary communication processes between the Baseband MCU (e.g. the processor 230 of FIG. 2) and the subscriber identity card MCU. The Baseband MCU operates as a master and initiates commands to the MCU of subscriber identity card. Note that the subscriber identity card procedures may end in '90 00' (indicating normal ending to the initiated command), or may end in '91 XX' (indicating response data available from a subscriber identity card). The response code '91 XX' may also inform the Baseband MCU that the previous command has been successfully executed by the MCU of subscriber identity card in the same way as '90 00' (i.e. "OK"), as well as, indicate response data which contains an SAT/USAT proactive command from the MCU of subscriber identity card for a particular procedure. The value 'XX' indicates the length of the response data. Following, the Baseband MCU uses the FETCH command to obtain the response data indicating a particular SAT/USAT proactive command. If the indicated command has been successfully executed, the Baseband MCU informs the MCU of subscriber identity card of "TERMINAL RESPONSE". If the indicated command is not successfully executed, the Baseband MCU informs the MCU of subscriber identity card of "TERMINAL RESPONSE" with an error condition.

Figure 5:
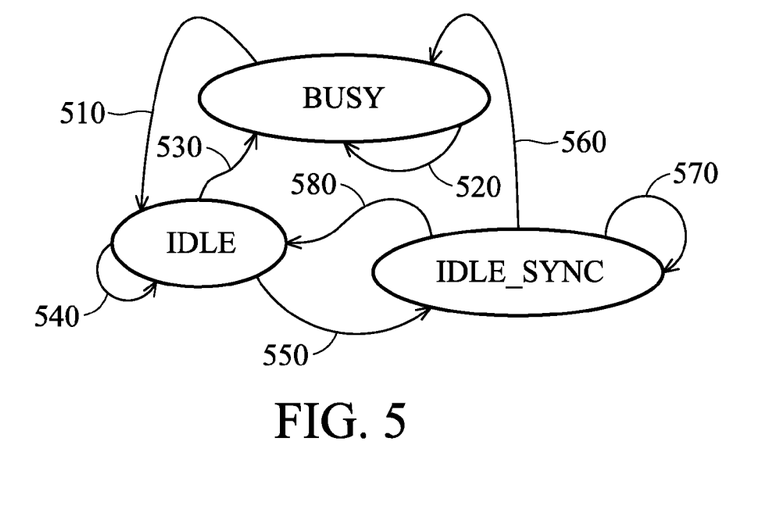
FIG. 5 shows a 3-states machine for the subscriber identity card B.

In order to aligning polling to subscriber identity cards A and B, a software module A corresponding to the subscriber identity card A operates as a master to coordinately start and/or cancel synchronization of the polling. When executing the software module B corresponding to the subscriber identity card B, the Baseband MCU (e.g. the processor 230 of FIG. 2) maintains a 3-states machine, as shown in FIG. 5, containing three states: BUSY; IDLE; and IDLE-SYNC. In the BUSY state, when receiving a signal from the timer B indicating that a specific time period (e.g. 30 seconds) has been reached the BUSY state is changed to the IDLE state (as shown in arrow 510), the timer B is reset to re-count and a STATUS command is issued to the subscriber identity card B, so as to poll the subscriber identity card B. Moreover, when completing a communication process between the Baseband chip and the subscriber identity card B the BUSY state is held (as shown in arrow 520) and the timer B is reset to re-count. In the IDLE state, when completing a communication process between the Baseband chip and the subscriber identity card B (e.g. SAT/USAT command) the IDLE state is changed to the BUSY state (as shown in arrow 530), and the timer B is reset to re-count. Furthermore, when receiving a signal from the timer B indicating that the specific time period has been reached the IDLE state is held (as shown in arrow 540), the timer B is reset to re-count and a STATUS command is issued to the subscriber identity card B. Moreover, when receiving a signal indicating that polling to subscriber identity cards A and B is required to be synchronized (i.e. the timers A and B are required to be synchronized) the IDLE state is changed to the IDLE-SYNC state (as shown in arrow 550), the timer B is reset to re-count and a STATUS command is issued to the subscriber identity card B. Such signal indicating that polling to subscriber identity cards A and B is required to be synchronized is typically issued by a software module A corresponding to the subscriber identity card A when executing, and details of the issuance timings are to be described later. In the IDLE_SYNC state, when completing a communication process between the Baseband chip and the subscriber identity card B (e.g. SAT/USAT command) the IDLE_SYNC state is changed to the BUSY state (as shown in arrow 560), and the timer B is reset to re-count. Moreover, when receiving a signal from the timer B indicating that the specific time period has been reached the IDLE_SYNC state is held (as shown in arrow 570), the timer B is reset to re-count and a STATUS command is issued to the subscriber identity card B. Moreover, when receiving a signal indicating that polling to subscriber identity cards A and B has not been synchronized (i.e. timers A and B have not been synchronized) the IDLE_SYNC state is changed to the IDLE state (as shown in arrow 580). Such signal indicating that polling to subscriber identity cards A and B has not been synchronized is typically issued by a software module A corresponding to the subscriber identity card A when executing, and details of the issuance timings are to be described later.

Figure 6:
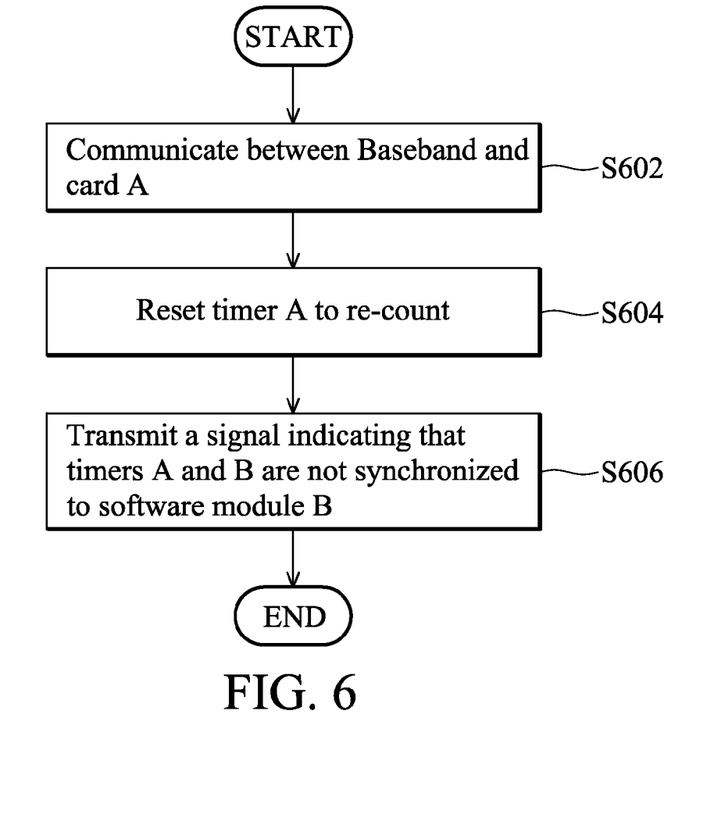
FIG. 6 shows a flow chart illustrating a method for aligning polling timers by executing a software module A for the subscriber identity card A.

When executing the software module A corresponding to the subscriber identity card A the Baseband MCU performs an embodiment of a method for canceling polling alignment, as shown in FIG. 6. In the process, after completing a communication process between the Baseband and the subscriber identity card A (step S602), the timer A is reset to re-count (step S604), and then transmits a signal indicating that polling to subscriber identity cards A and B has not been synchronized to the software module B thereby enabling the software module B to enter the IDLE state (step S606).

Figure 7:
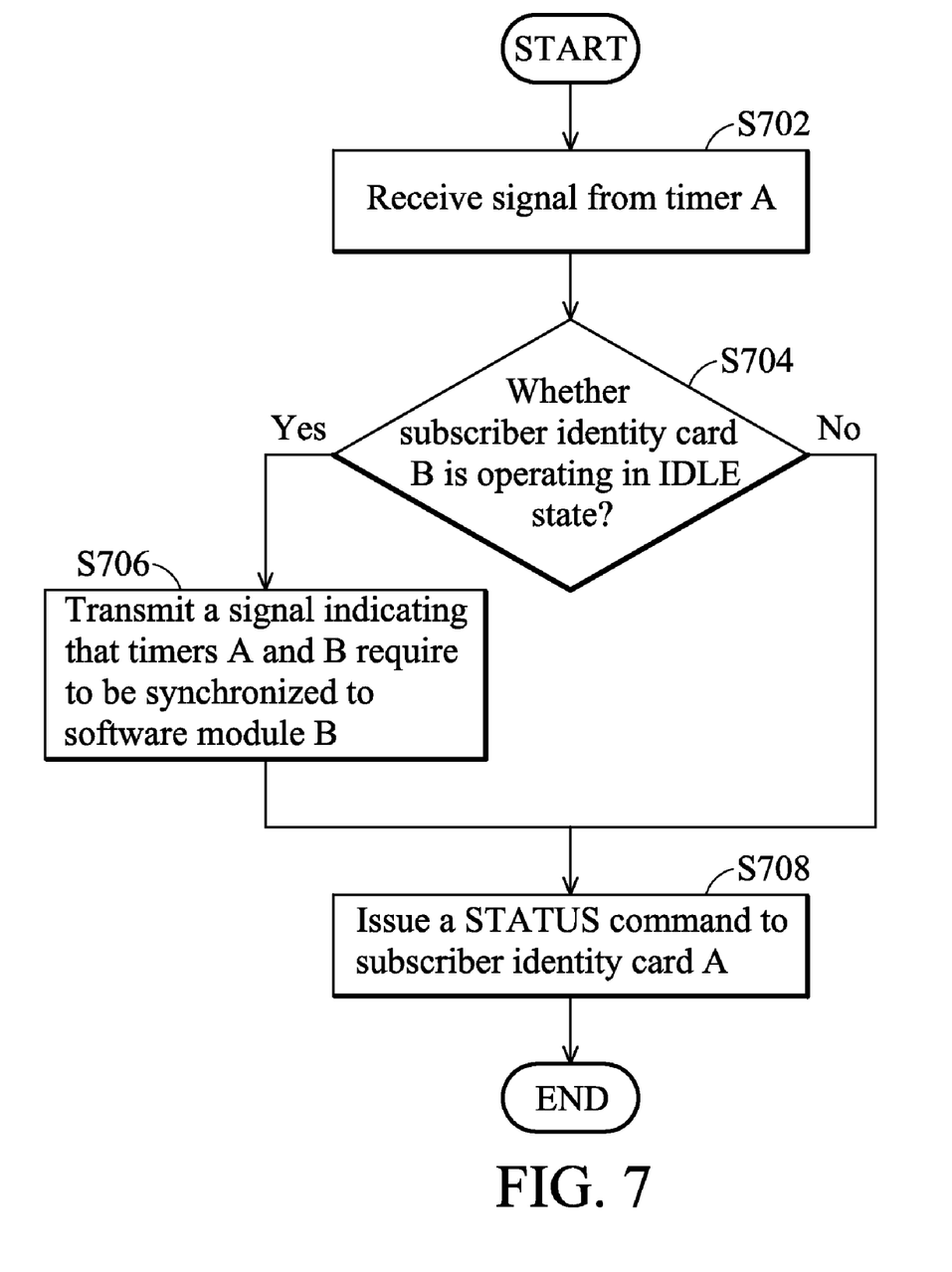
FIG. 7 shows a flow chart illustrating another method for aligning polling timers by executing a software module A for the subscriber identity card A.

Furthermore, when executing the software module A corresponding to the subscriber identity card A, the Baseband MCU performs an embodiment of a method for starting polling alignment, as shown in FIG. 7. In the process, it is determined whether the subscriber identity card B is operated in the IDLE state (step S704) after receiving a signal from the timer A (step S702). If so, a signal indicating that polling to subscriber identity cards A and B is require to be synchronized is transmitted to the software module B (step S706) and then a STATUS command is issued to the subscriber identity card A (step S708) thereby enabling the STATUS commands to be adjacently issued to the subscriber identity cards A and B. It is to be understood that, thereafter, two tasks one for issuing a STATUS command to poll the subscriber identity card A and the other for issuing a STATUS command to poll the subscriber identity card B will be put in a job queue one after another and to be executed by a scheduling module. Otherwise, a STATUS command is issued to the subscriber identity card A (step S708).

Figure 8:
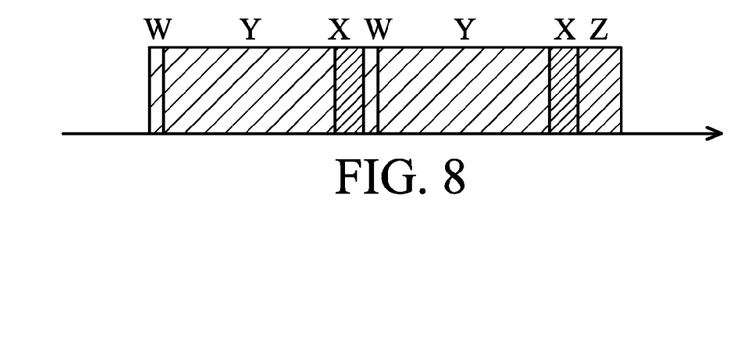
FIG. 8 shows a schematic diagram illustrating a sequence of time slots for issuing STATUS commands to the subscriber identity cards A and B when performing embodiments of methods for aligning polling timers.

FIG. 8 shows a schematic diagram illustrating a exemplary sequence of time slots for issuing STATUS commands to the subscriber identity cards A and B when performing embodiments of methods for aligning polling timers. When detecting that two tasks one for polling the subscriber identity card A and the other for polling the subscriber identity card B are queued, a scheduling module performed by the Baseband MCU may integrate these two tasks into an integrated task and execute the integrate one to issue STATUS commands to the subscriber identity cards A and B with the exemplary sequence of time slots. Compared to FIG. 3, one time interval Z is reduced in each issuance process to both subscriber identity cards A and B, leading to less power consumption. Specifically, referring to FIG. 2, during the former time interval W, the Baseband chip 220 also directs the clock generator 250 to generate the clock signals with a frequency of a multiple of 13 MHz, and accordingly provides clock signals of 4.25 MHz to the dual SIM controller 240 and directs the dual SIM controller 240 to provide the clock signals of 4.25 MHz to the subscriber identity cards A or/and B. During the former time interval Y, the Baseband chip 220 issues a STATUS command to the subscriber identity card A with the provided clock signal through the dual SIM controller 240. During the former time interval X, the Baseband chip 220 may direct the dual SIM controller 240 to connect its SIM interface to the subscriber identity card B via the SPI interface. Subsequently, during the later time interval Y, the Baseband chip 220 issues a STATUS command to the subscriber identity card B with the provided clock signal through the dual SIM controller 240. During the later time interval X, the Baseband chip 220 directs the dual SIM controller 240 to connect the SIM interface to the subscriber identity card A via the SPI interface. And then, at the end of the time interval Z, the Baseband chip disables the clock signal provided to the subscriber identity cards A and B, disables the clock signal provided to the dual SIM controller 240 and disables the clock generator 250. Those skilled in the art may revise the scheduling module without departure from the spirit of the invention to issue a STATUS command to the subscriber identity card A adjacently following issuance of a STATUS command to the subscriber identity card B.

Figure 9:
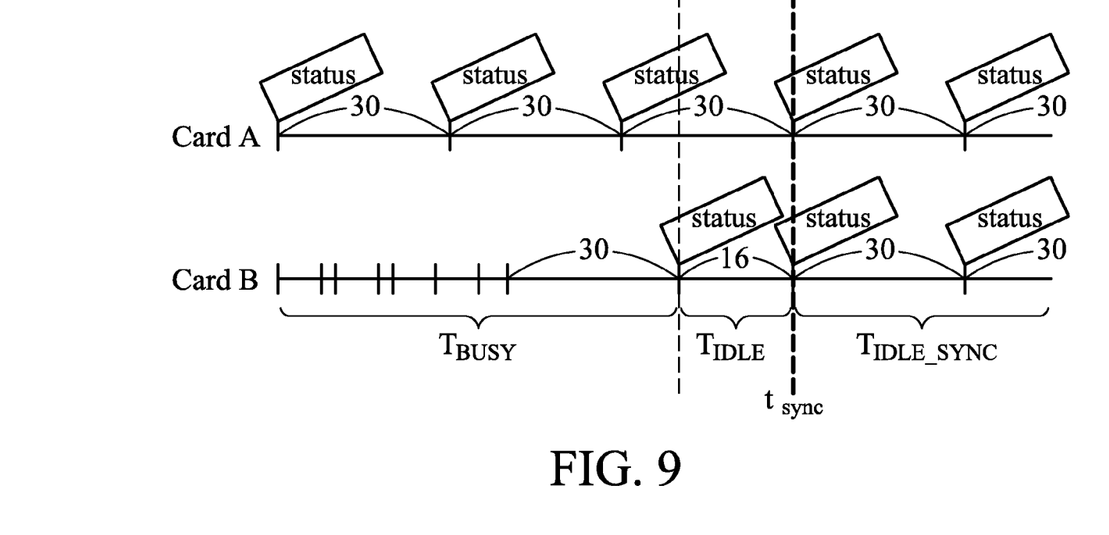
FIG. 9 shows a schematic diagram illustrating the issuance of STATUS commands being aligned by using the described embodiments of methods for aligning polling timers of the invention.

As a result, referring to FIG. 9, it is shown that the issuance of STATUS commands is aligned by using the described embodiments of methods to reduce power consumption. The Baseband MCU may issue a STATUS command to the subscriber identity card A every 30 seconds counted by the timer A. Assume that the subscriber identity card B operates in the BUSY state during a time period $T_{BUSY}$, the IDLE state during a time period $T_{IDLE}$ and the IDLE_SYNC state during a time period $T_{IDLE\_SYNC}$. At time $t_{sync}$, a 30 second period counted by the timer A has been reached. After that, the Baseband MCU may receive a signal indicating that polling to subscriber identity cards A and B is required to be synchronized. Thus, the Baseband MCU may adjacently issue STATUS commands to the subscriber identity card A and B as shown in FIG. 8.

Figure 10:
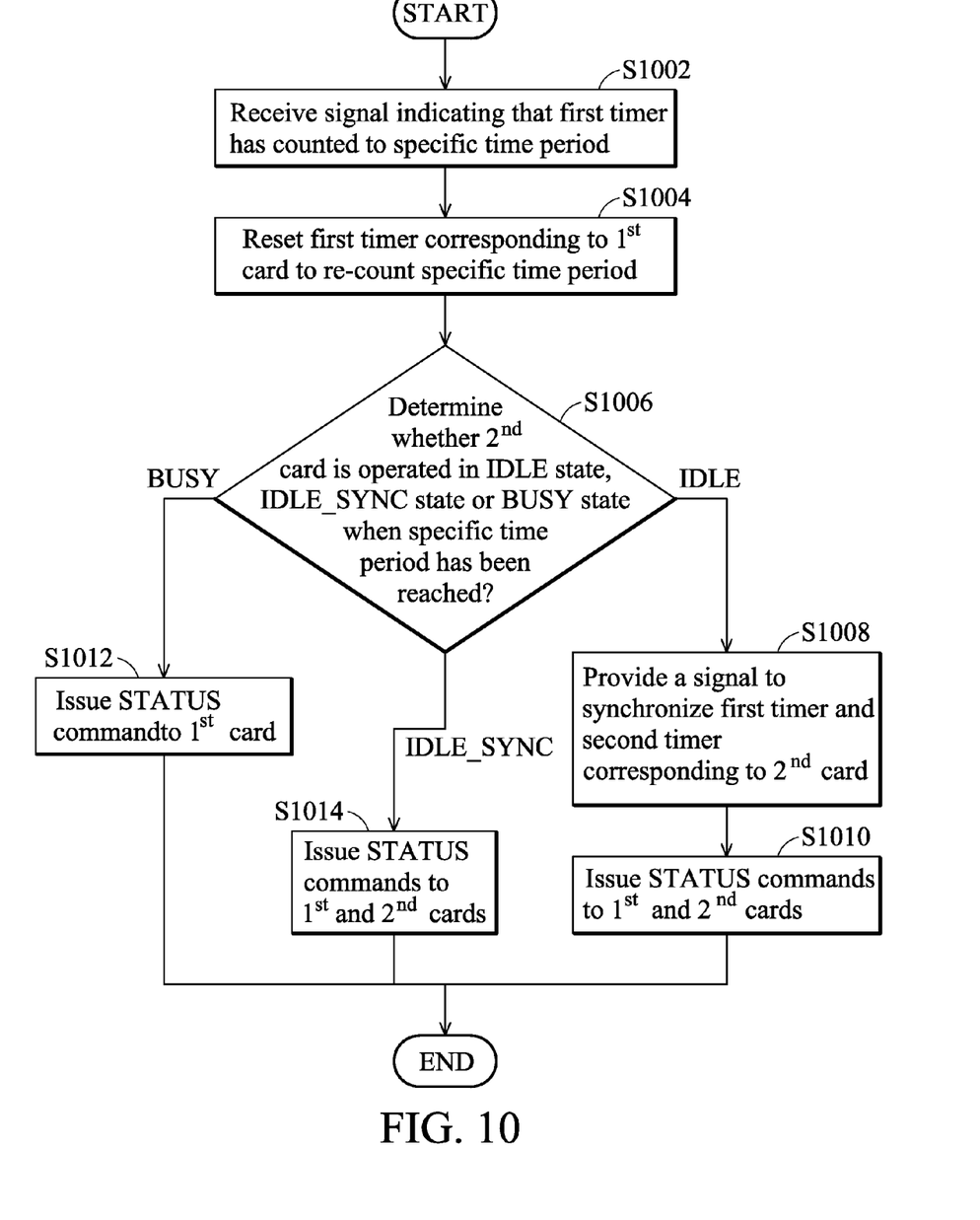
FIG. 10 shows a flow chart illustrating a method for aligning polling timers by a mobile station with a first subscriber identity card and a second subscriber identity card according to an embodiment of the invention.

FIG. 10 shows a flow chart illustrating a method for aligning polling timers by a mobile station with a first subscriber identity card (e.g. card A of FIG. 2) and a second subscriber identity card (e.g. card B of FIG. 2), being performed when executing software/firmware code by a processor of the mobile station (e.g. 230 of FIG. 2), according to an embodiment of the invention. First, in step S1002, a signal indicating that a first timer corresponding to the first subscriber identity card has counted to a specific time period, also called polling time period (e.g. 30 seconds), is received. Next, in step S1004, the first timer corresponding to the first subscriber identity card is reset to re-count to the specific time period. Next, it is determined whether the second subscriber identity card is operated in an IDLE state, IDLE_SYNC state or BUSY state when the specific time period has been reached (step S1006). The second subscriber identity card being operated in an IDLE state indicates that the second subscriber identity card will be periodically polled and forthcoming periodic timings for polling the first and second subscriber identity cards are substantially inconsistent. The second subscriber identity card being operated in a BUSY state indicates that communications between the second subscriber identity card and the processor has not been idle substantially over the specific time period. The second subscriber identity card being operated in an IDLE_SYNC state indicates that the second subscriber identity card will be periodically polled and forthcoming periodic timings for polling the first and second subscriber identity cards are substantially consistent. If the second subscriber identity card is operated in an IDLE state, a signal is provided to synchronize polling to the first and second subscriber identity cards (i.e. synchronize the first timer and a second timer corresponding to the second subscriber identity card) (step S1008), to force the second subscriber identity card to enter an IDLE_SYNC state, resulting in adjusting forthcoming periodic timings for polling the first and second subscriber identity cards to be substantially consistent. Next, the STATUS commands are issued to poll the first and second subscriber identity cards (step S1010). If the second subscriber identity card is operated in a BUSY state, a STATUS command is issued to poll the first subscriber identity card (step S1012). If the second subscriber identity card is operated in an IDLE_SYNC state, the STATUS commands are issued to poll the first and second subscriber identity cards (step S1014).

Figure 11:
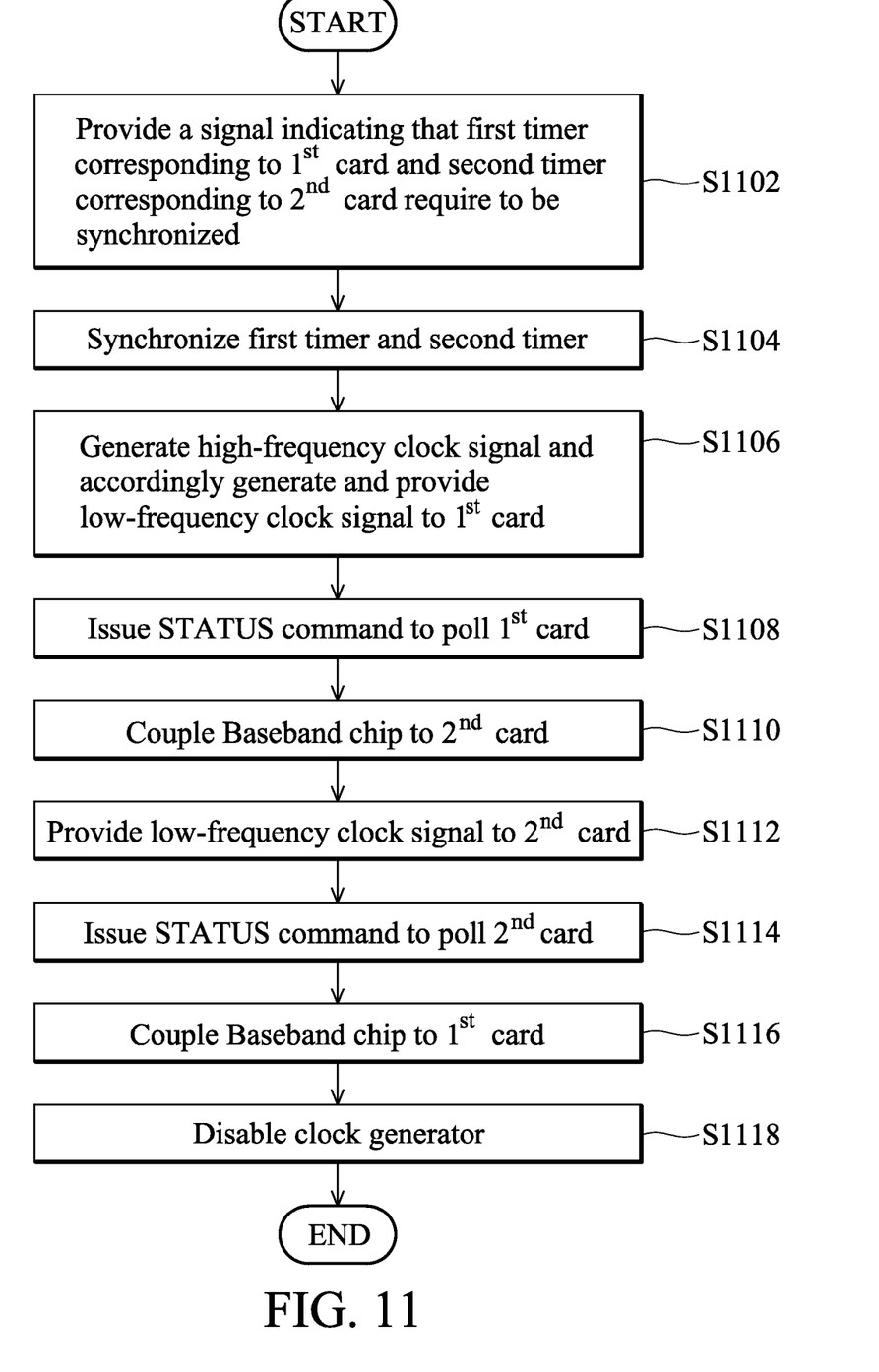
FIG. 11 shows a flow chart illustrating a method for aligning polling timers by a mobile station with a Baseband chip, a first subscriber identity card and a second subscriber identity card according to another embodiment of the invention.

FIG. 11 shows a flow chart illustrating a method for aligning polling timers by a mobile station with a Baseband chip (e.g. 220 of FIG. 2), a first subscriber identity card (e.g. card A of FIG. 2) and a second subscriber identity card (e.g. card B of FIG. 2), being performed when executing software/firmware code by a processor of the mobile station (e.g. 230 of FIG. 2), according to another embodiment of the invention. First, it is determined that the second subscriber identity cards is operated in an IDLE state, thus a signal indicating that a first timer corresponding to the first subscriber identity card and a second timer corresponding to the second subscriber identity card are required to be synchronized is provided (step S1102). Next, both the first timer and the second timer are set to re-count to a specific time period according to the signal (step S1104). After the first and second timers counts to the time period, two tasks, one for polling the first subscriber identity card and the other for polling the second subscriber identity card are integrated into an integrated task, and the integrated task is executed. Details of execution of the integrated task are described below. Taking the former time interval W of FIG. 8 as an example, a clock generator (e.g. 250 of FIG. 2) is enabled to generate clock signals with a higher frequency, and clock signals with a lower frequency are converted from the high-frequency clock signals and provided to the first subscriber identity card (step S1106). Taking the former time interval Y of FIG. 8 as an example, a STATUS command is issued to poll the first subscriber identity card with the provided clock signal (step S1108). Taking the former time interval X of FIG. 8 as an example, the Baseband chip is coupled to the second subscriber identity card (step S1110). Next, taking the later time interval W of FIG. 8 as an example, the converted low-frequency clock signal is provided to the second subscriber identity card (step S1112). Taking the later time interval Y of FIG. 8 as an example, a STATUS command is issued to poll the second subscriber identity card with the provided clock signal (step S1114). Taking the later time interval X of FIG. 8 as an example, the Baseband chip is coupled to the first subscriber identity card (step S1116).

Next, taking the time interval Z as an example, low-frequency clock signals are stopped providing to the first and second subscriber identity cards and the clock generator is disabled to stop generating high-frequency clock signals (step S1118).

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for aligning polling timers by a mobile station with a first subscriber identity card and a second subscriber identity card, performed by a processor of the mobile station, comprising:
    determining whether the second subscriber identity card is operated in an IDLE state when a first timer corresponding to the first subscriber identity card counts to a specific time period; and
    adjusting forthcoming periodic timings to adjacently poll the first subscriber identity card and the second subscriber identity card when the second subscriber identity card is operated in an IDLE state.

2. The method as claimed in claim 1, wherein the second subscriber identity card being operated in the IDLE state indicates that the second subscriber identity card will be periodically polled and forthcoming periodic timings for polling the first and second subscriber identity cards are substantially inconsistent.

3. The method as claimed in claim 1, wherein the first timer is reset to re-count to the specific time period when polling the first subscriber identity card and a second timer corresponding to the second subscriber identity card is reset to re-count to the specific time period when polling the second subscriber identity card.

4. The method as claimed in claim 1, wherein the step of adjusting forthcoming periodic timings for polling the first and second subscriber identity cards to be substantially consistent further comprises:
    forcing the second subscriber identity card to enter an IDLE_SYNC state, resulting in adjusting forthcoming periodic timings for polling the first and second subscriber identity cards to be substantially consistent.

5. The method as claimed in claim 4, wherein a second timer corresponding to the second subscriber identity card is reset to re-count to the specific time period when the second subscriber identity card enters the IDLE_SYNC state.

6. The method as claimed in claim 4, wherein the second subscriber identity card being operated in the IDLE_SYNC state indicates that the second subscriber identity card will be periodically polled and forthcoming periodic timings for polling the first and second subscriber identity cards are substantially consistent.

7. The method as claimed in claim 4, further comprising:
    forcing the second subscriber identity card to return to the IDLE state when detecting that the processor starts to communicate with the first subscriber identity card.

8. The method as claimed in claim 1, wherein the first or second subscriber identity cards is polled by an STATUS commands, and the polling checks if the first or second subscriber identity card has been removed.

9. The method as claimed in claim 4, further comprising:
    forcing the second subscriber identity card to enter a BUSY state when detecting that the processor starts to communicate with the second subscriber identity card.

10. The method as claimed in claim 9, wherein the second subscriber identity card being operated in the BUSY state indicates that communications between the second subscriber identity card and the processor has not been idle substantially over the specific time period.

11. A method for aligning polling timers by a mobile station with a Baseband chip, a first subscriber identity card and a second subscriber identity card, performed by a processor of the mobile station, comprising:
    integrating two tasks, one for polling the first subscriber identity card and the other for polling the second subscriber identity card, into an integrated task for adjacently polling both the first and second identity cards when detecting a job queue comprising these two tasks; and
    executing the integrated task.

12. The method as claimed in claim 11, wherein the execution step further comprises:
    enabling a clock generator to generate a first clock signal with a higher frequency each time a job queue comprising tasks for polling both the first and second subscriber identity card;
    converting the first clock signal to a second clock signal with a lower frequency;
    providing the second clock signal to the first subscriber identity card;
    polling the first subscriber identity card with the provided second clock signal;
    providing the second clock signal to the second subscriber identity card;
    polling the second subscriber identity card with the provided second clock signal; and
    stopping providing the second clock signal and disabling the clock generator after completing polling to the first and second subscriber identity cards.

13. The method as claimed in claim 12, wherein the execution step further comprises:
    coupling the Baseband chip providing the second clock signal to the second subscriber identity card after completing polling to the first subscriber identity card.

14. A system for aligning polling timers associated with a first subscriber identity card and a second subscriber identity card, comprising:
    a processor adjusting forthcoming periodic timings for polling the first and second subscriber identity cards to be substantially consistent, enabling two tasks one for polling the first subscriber identity card and the other for polling the second subscriber identity card are to be generated and put in a job queue one after another, and adjacently polling the first and second subscriber identity cards when detecting that the job queue comprising the tasks.

15. The system as claimed in claim 14, wherein the processor further integrates the tasks into an integrated task for adjacently polling both the first and second identity cards.

16. The system as claimed in claim 15, further comprising a clock generator and a Baseband chip, wherein the processor, when executing the integrated task, enables the clock generator to generate a first clock signal with a higher frequency, converts the first clock signal to a second clock signal with a lower frequency, provides the second clock signal to the first subscriber identity card, polls the first subscriber identity card with the provided second clock signal, couples the Baseband chip providing the second clock signal to the second subscriber identity card after completing polling to the first subscriber identity card, provides the second clock signal to the second subscriber identity card, polls the second subscriber identity card with the provided second clock signal and stops providing the second clock signal and disables the clock generator after completing polling to the first and second subscriber identity cards.

17. The system as claimed in claim 14, wherein the processor, for adjusting forthcoming periodic timings for polling the first and second subscriber identity cards to be substantially consistent, further resets a first timer corresponding to the first subscriber identity card to re-count to a predetermined time period and resets a second timer corresponding to the second subscriber identity card to re-count to the predetermined time period, and the task for polling the first subscriber identity card will be generated whenever the first timer counts to the predetermined time period and the task for polling the second subscriber identity card will be generated whenever the second timer counts to the predetermined time period.

18. The system as claimed in claim 17, wherein the processor further issues a first STATUS command to the first subscriber identity card to check if the first subscriber identity card has been removed and issues a second STATUS command to the second subscriber identity card to check if the second subscriber identity card has been removed.

19. The method as claimed in claim 18, wherein the processor determines that the first subscriber identity card has been removed when no response data is received following issuance of the first STATUS command, and determines that the second subscriber identity card has been removed when no response data is received following issuance of the second STATUS command.

\* \* \* \* \*